July 11, 1933. K. W. MAYHEW ET AL 1,918,189
MEANS AND METHOD OF COVERING SPRINGS AND THE LIKE
Filed Oct. 1, 1930  4 Sheets-Sheet 1

Inventors
Kenneth W. Mayhew,
Melville E. Holloway,
By Barton A. Bean Jr.
Attorney

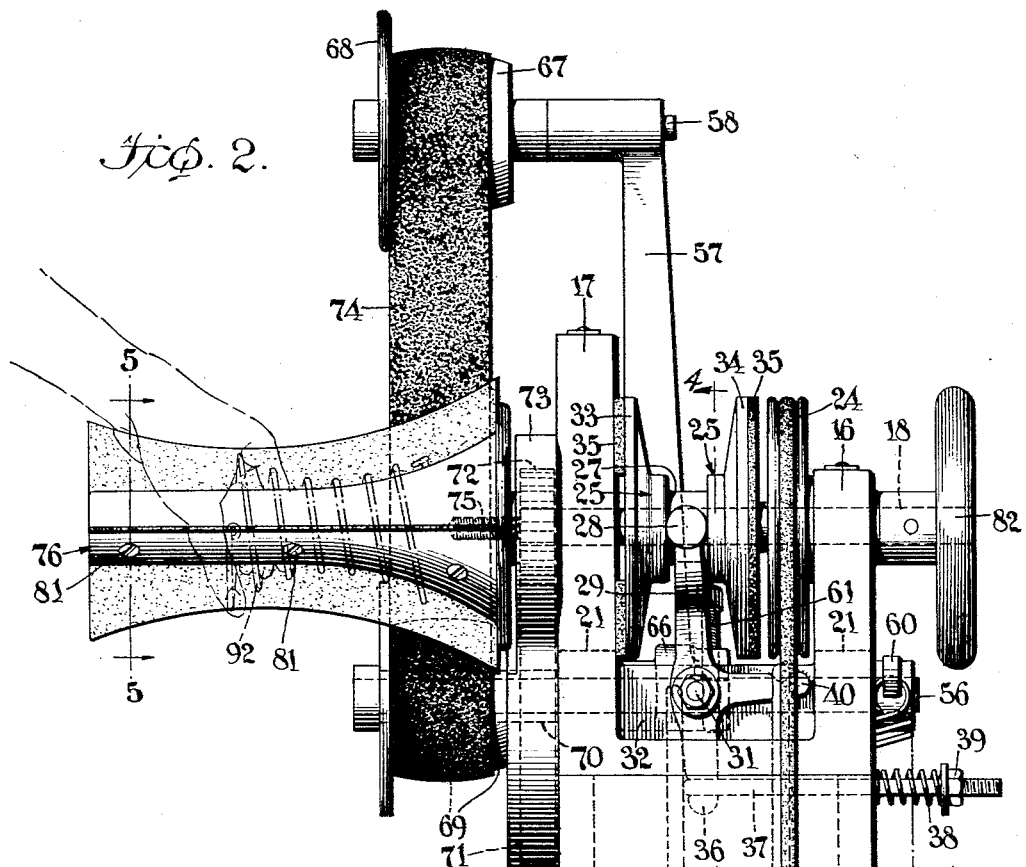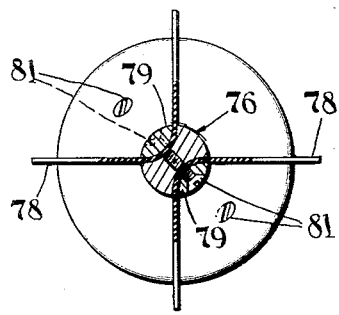

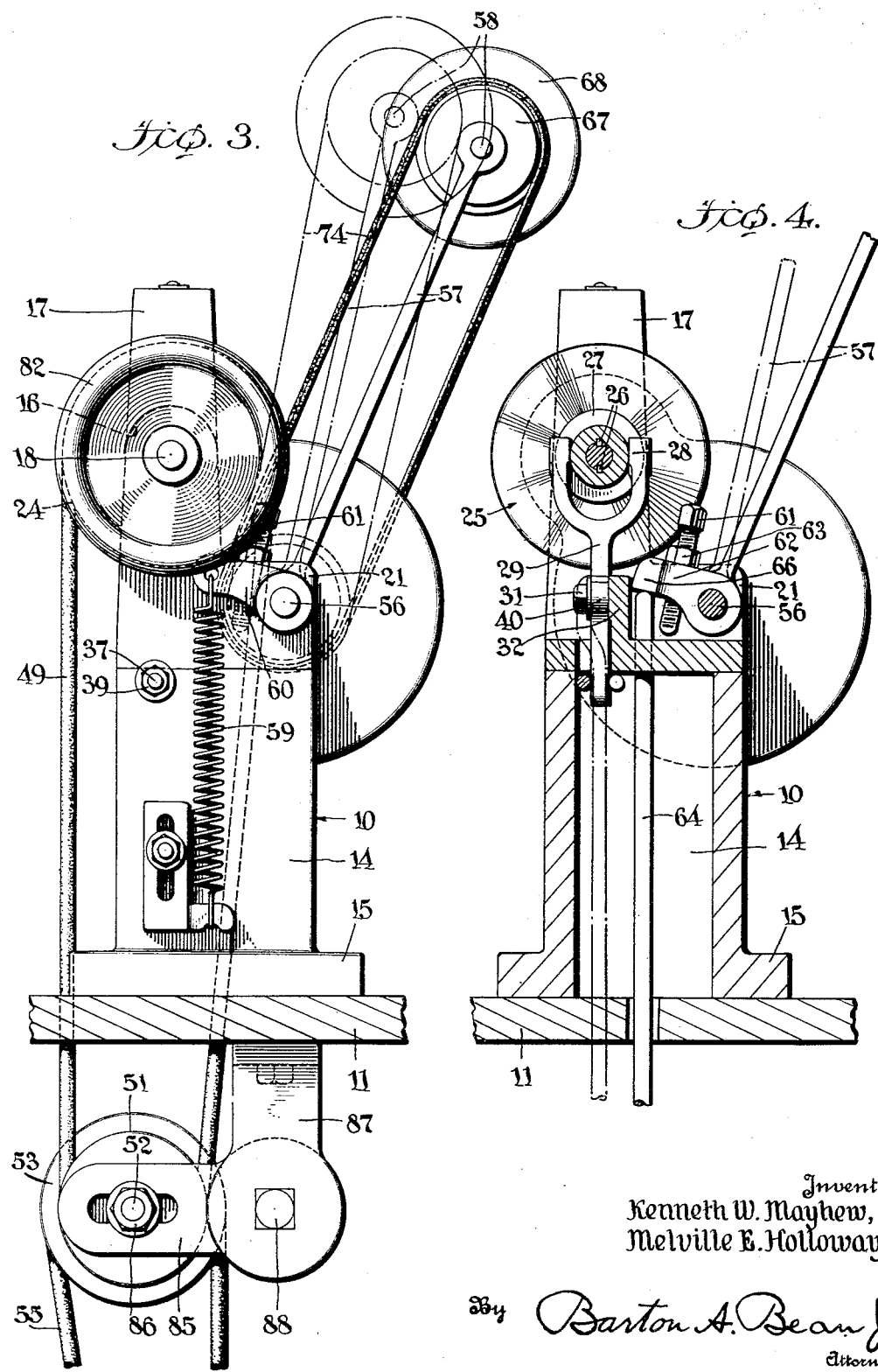

July 11, 1933.  K. W. MAYHEW ET AL  1,918,189
MEANS AND METHOD OF COVERING SPRINGS AND THE LIKE
Filed Oct. 1, 1930    4 Sheets-Sheet 4
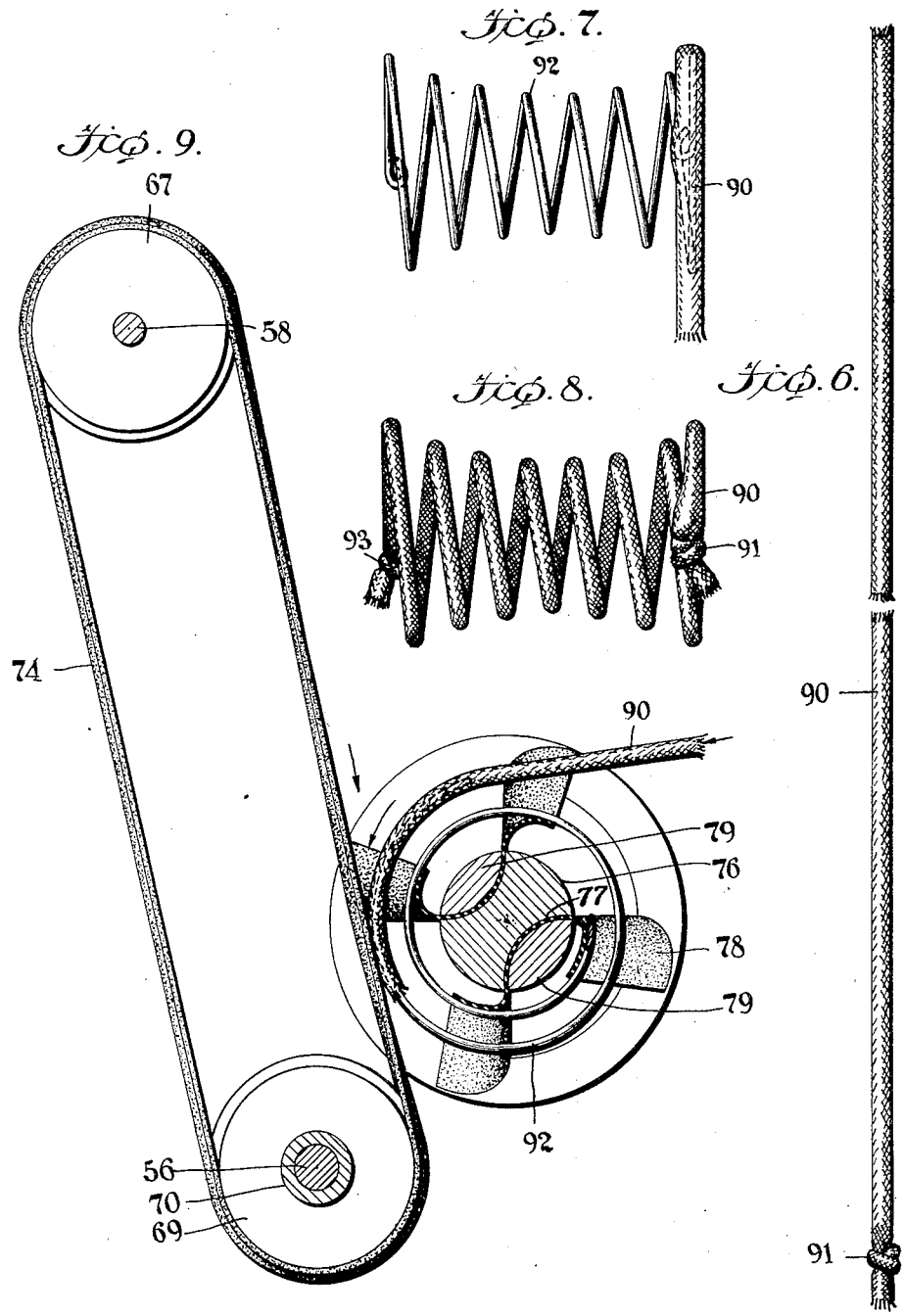
Inventors
Kenneth W. Mayhew,
Melville E. Holloway,
By Barton A. Bean Jr.
Attorney Patented July 11, 1933

1,918,189

UNITED STATES PATENT OFFICE

KENNETH W. MAYHEW, OF ANGELICA, AND MELVILLE E. HOLLOWAY, OF HAMBURG, NEW YORK, ASSIGNORS TO F. R. ATKINSON SPRING CO., OF HAMBURG, NEW YORK

MEANS AND METHOD OF COVERING SPRINGS AND THE LIKE

Application filed October 1, 1930. Serial No. 485,815.

This invention relates to a means and method of covering springs such as the helical spring commonly used in upholstery.

The spring covering comprises tubular strips of light woven fabric of diameter slightly larger than the spring wire and which are adapted to be threaded over the spring after the latter has been coiled and otherwise treated and is ready for mounting in the upholstery. The purpose of the cover, which preferably fits loosely about the spring, is to dampen vibrational noises set up by the spring during flexure, this being of particular value in upholstery used in automobiles where the springs, due to uneven road conditions and vibration set up within the vehicle, are under substantially constant flexure and are thus set into noise producing vibrations or oscillations.

The present invention contemplates a method of applying the covering to the spring which comprises cutting the tubular woven fabric, which may be produced in any desired manner, into strips corresponding in length to the spring wire and forming a knot at one end of each strip. The open end of a strip is then threaded over or onto the spring and, when this operation is completed, the open end of the strip is also knotted, thus completely encasing the spring and preventing it from slipping or sliding out of the casing in subsequent use. As the covering is of light woven fabric it is not capable of resisting tensional stresses but may be readily stretched in length with the consequent reduction in its diameter. The cover therefore may not be pulled in applying it to the spring as this would result in the fabric gripping the wire and binding thereon, nor may the cover be pushed into threaded relation over the spring, since because of its flexibility it would gather in small annular folds and also bind. It has been found, however, that the tube may be threaded over the wire by gripping it over a substantial portion of its area and sliding such portion bodily over the spring. As only a comparatively small area of the cover may be so gripped by a workman's hand, in manual threading operation, this task is slow and tedious, necessitating numerous repetitions of gripping and sliding the small portions of the fabric over short lengths of the spring. Such operation also necessitates undue stretching of the parts of the fabric adjacent to the gripped portion thereby weakening and reducing the life of the cover.

The present invention further provides a method of threading the covering material over the spring wherein a substantial portion of the total cover area extending throughout the length of the tubular strip is gripped and slid over the spring with continuous movement, thus reducing the time and labor required and also eliminating undue stretching of the fabric. This is done by inserting the end of the spring in the open end of the cover tube, pressing the spring into contact with the threading member which is adapted for relative movement with the spring in engagement with a substantial part of the spring area, whereby the cover is in effect carried by the threading member so that relative movement of the spring and threading member will cause the cover to slide over the spring or the spring slipped into the cover. The apparatus provided for carrying out this operation comprises a means adapted to engage portions of the spring and spring cover, and means to afford relative rotary or tangential movement between the portions of the spring and the threading head.

These and other objects and advantages will become apparent from a perusal of the following detailed description of a typical method and means embodying the principles of the invention, reference being made to the accompanying drawings wherein:—

Fig. 2 is a front elevation of the machine head.

Fig. 3 is a side elevation of the machine head shown in Fig. 2 looking from the right of Fig. 1.

Fig. 4 is a vertical section taken on line 4—4 of Fig. 2.

Fig. 5 is a transverse cross-sectional view taken on line 5—5 of Fig. 2.

Fig. 6 is an elevational view of a strip of woven fabric tubing, having a knot at one end, and ready for threading over a spring.

Fig. 7 shows the cover tube started over the end of a helical spring.

Fig. 8 is a view showing the cover completely threaded over the tube and knotted at both ends.

Fig. 9 is a view showing the relation of the spring and cover to the covering machine at an early phase of the threading operation.

Figure 1:
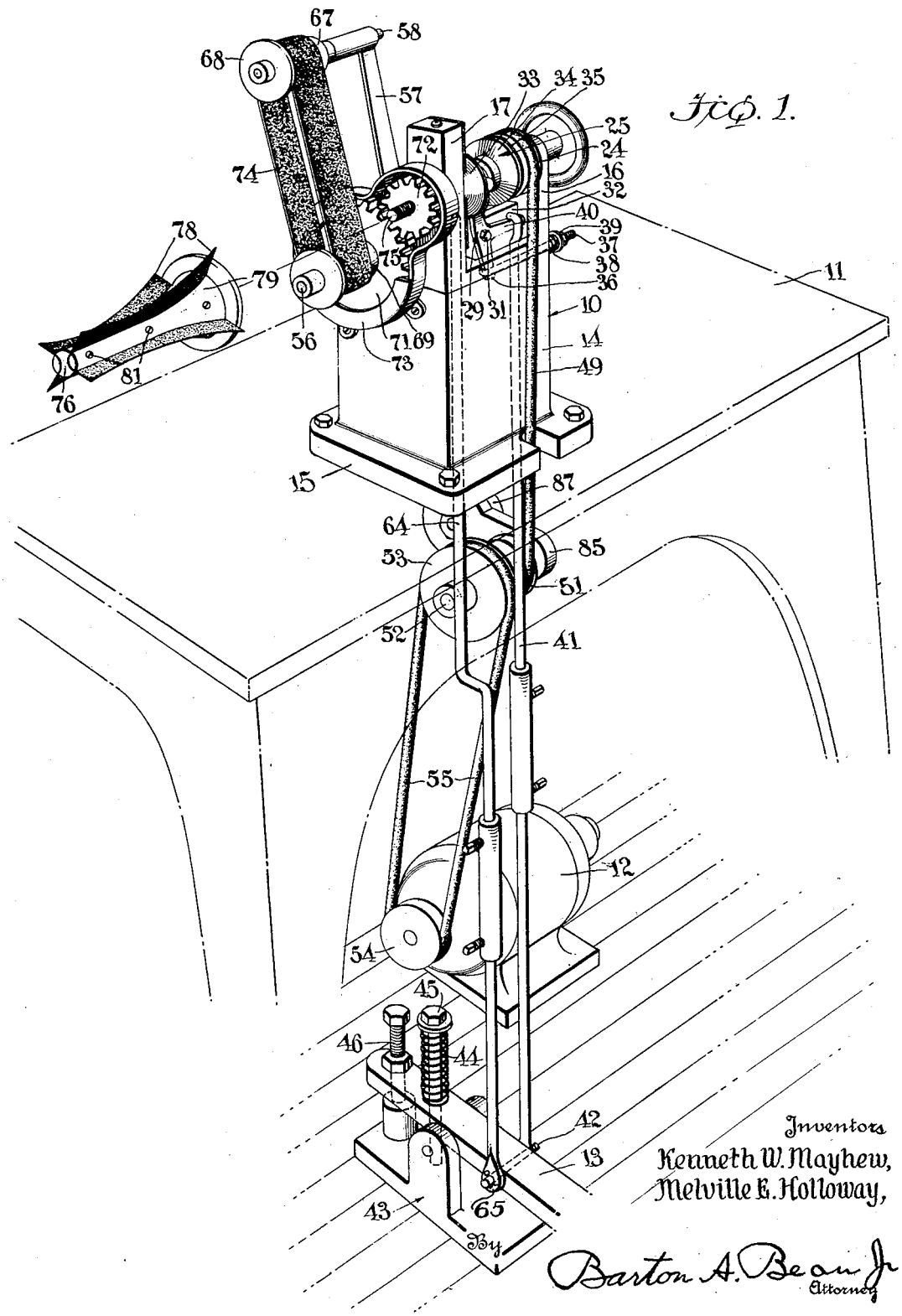
Fig. 1 is a perspective view taken from the front and left hand side of the apparatus the threading head of the machine being shown in detached relation therefrom.

As shown in Fig. 1, the threading device comprises a machine head or base member 10, mounted at a convenient height on a bench or table 11, being actuated by a motor 12 and controlled by a foot treadle 13. The head 10 has a body member 14, provided with flanges 15 for securing the body to the bench, and right and left hand bearing extensions 16 and 17 respectively, for journalling a horizontal drive shaft 18, the extension 17 being enlarged for a purpose hereinafter described. A pulley 24 is mounted for free rotation on the shaft 18 adjacent to the bearing 16, and a rotary member 25, disposed between the pulley 24 and the extension 17, is splined to the shaft by keys 26, shown in Fig. 4, affording the member 25 limited movement axially of the shaft 18.

The rotary member has a central annular groove 27 for seating the bulbous end 28 of a forked lever 29, pivoted at 31 to an upstanding flange 32 formed on the casting 14, and a pair of annular flanges 33 and 34. The latter is provided with friction facing material 35, which is also applied to the inner face of the extension 17. The lower end 36 of the lever 29 is notched to engage a hook formed on the end of a rod 37 which is constantly urged, by a spring 38, in a direction toward the lever to move the flange or the brake disk 33 into braking engagement with the extension 17. A nut 39, backed by a washer, is threaded to the outer end of the rod for providing means for varying the compression of the spring 38 and accordingly varying the pressure on the braking surfaces 17 and 35.

A laterally extended arm 40 of the lever 29 is notched to engage the hooked end of a vertical rod 41, which is pivoted at 42 to the treadle 13. The latter is pivotally supported inwardly of 42 by a bracket 43 and the forward portion of the treadle is normally held in elevated position by compression spring 44, attached to the bracket by a bolt 45, this upward position being limited or determined by adjustable stop means 46. Depression of the treadle 13 will move the rod 41 and lever arm 40 downwardly, causing the member 25 to move to the right, thereby releasing the brake elements 17, 33 and causing the lining 35 on the clutch flange 34 to engage the pulley 24. The latter is connected by an endless belt 49 to a pulley 51 mounted on a shaft 52 for rotation with another pulley 53 which is operably connected to the pulley 54 on the motor 12 by an endless belt 55. The motor is adapted to positively rotate the pulley wheel 24 in a counter-clockwise direction as shown in Fig. 1, and the shaft 18 may be connected for rotation with the pulley wheel by depression of the treadle 13 to effect engagement of the clutch parts 34, 35 and 24. Upon being released the treadle will be raised by the springs 38 and 44, the clutch part released, and the brake members 33, 35 and 17 engaged to stop rotation of the shaft 18.

A horizontal rock shaft 56, paralleling the drive shaft 18, is journalled in bearings 21, formed on the body 14 rearwardly of the bearings 16 and 17, and carries an affixed rock arm 57 having a stud shaft 58 at its upper end. The arm 57 and shaft 56 are constantly urged in a clockwise direction, as viewed in Fig. 1, by a tension spring 59 attached to the casing 14 and to a lever 60 affixed to the right end of the rock shaft 56, such clockwise movement being limited by a set screw 61 threaded through a lug extension 62 formed on the rock arm and adapted to abut the upper surface of the casting 14. A lock nut 63 is threaded on the set screw in order that the latter may be adjusted and locked to allow the rock arm to assume any desired limit position in its forward movement. The rock arm may be moved rearwardly or in a clockwise direction, as viewed in Figs. 3 and 4 by upward movement of a rod 64, which is pivotally attached to the treadle at 65 and extends through the casting 14 to engage a cam lug 66 formed with the rock arm. It will be noted that the pressure of the treadle will lower the rod 64, allowing the tension spring 59 to move the rock shaft 56 and cam 66 in a counter-clockwise direction to effect forward movement of the rock arm 57 to a position indicated by broken lines and that upon release of the pressure upon the treadle, the spring 44 will become effective to raise the treadle, rod and cam to effect an opposite or rearward movement of the arm to a position shown in solid lines in Fig. 4.

A relatively wide crown pulley 67 having an annular retaining flange 68 is mounted on the stud shaft 58 for free rotation with respect to the rock arm, and a similar pulley 69 is freely mounted on the rock shaft 56 in alignment with the pulley 67. The crown pulley 69 is fixed for rotation, by means of a sleeve 70, with a driven gear 71 which constantly meshes with a drive pinion 72 affixed to the drive shaft 18, both the pinion and gear being housed in a protective casing 73 attached to the casting 14. An endless belt 74, preferably formed of rubber or like resilient material, is tensioned over the crown pulleys and will travel thereover in a clockwise direction, as viewed in Fig. 1, when the treadle is depressed and the clutch is engaged to rotate the drive shaft 18. The arm 57 will, at substantially the same time that such rotation is commenced be moved forwardly, by the lowering of the rod 64, until the set screw 61 abuts the casting 14.

The left hand end of the shaft 18 is extended to provide a threaded stud 75 for receiving the spring cover threading head. The latter preferably comprises a metal core 76, having opposed longitudinal recesses 77 formed thereon for receiving the medial portions of flexible fins 78, preferably formed of rubber, which are held in place by filler blocks 79 secured to the core by screws 81. The fins are of a shape similar to that of the coiled helical spring to be covered, but are of larger dimensions than the spring. The core, also of shape corresponding generally to that of the spring, may be threaded to the stud 75 by counterclockwise rotation of the shaft 18, which may be effected by turning the hand wheel 82 mounted on the right end of the shaft.

Preparatory to operating the machine, the drive belts 49 and 55 are tightened by adjusting the pulley shaft 52. This member is adjustably supported in a slotted arm 85 by a lock nut 86, the arm being adjustably retained for angular movement about its point of attachment to a bracket 87 by a screw 88. The belts may be tensioned by loosening the lock nut 86 and the screw 88 to permit lateral movement of the shaft 52 and angular movement of the arm 85. The set screw 61 is then adjusted to allow the arm 57 in its forwardmost position to hold the flexible belts lightly spaced from the periphery of the threading head core 76.

The woven covering fabric in tubular form is cut to lengths 90 corresponding to the length of the spring wire to be covered and is knotted at 91, adjacent one end, as depicted in Fig. 6. The motor 12 is then set into operation rotating the pulley 24 and the cover 90 is grasped by the operator's right hand at its unknotted or open end and threaded over the inner end of the coiled upholstery spring 92, as indicated in Fig. 7. The spring, preferably provided with looped ends to prevent its piercing the cover, is grasped in the left hand of the operator, as illustrated in the dotted lines in Fig. 2, and is passed over the head core 76 and fins 78, the latter flexing and firmly contacting with a large area of the inner surface of the spring. The treadle may at the same time be depressed by the operator's foot, setting the threading head into counter-clockwise motion and the flexible feeding belt 74 into clockwise motion. As shown in Fig. 9, the belt 74, carried forward by the rock arm 57 upon depression of the treadle, will engage the outer surface of the tube 90 and wipe or slide it onto the inner end of the spring 92.

The fins 78, gripping the inner surface of the cover tube will slide the latter over the entire length of the spring until the knotted end 91 of the tube abuts the inner spring end. The foot pressure on the treadle is then released, causing the brake means 33, 35 and 17 to become effective to stop the shaft, and allowing the rod 64 to throw the arm 57 rearwardly, carrying the belt 74 out of engagement with the covered spring 91. The latter may then be withdrawn from the threading head and a knot 93 tied on the outer cover end, thereby completely engaging the spring, which may then be mounted in upholstery, or otherwise used as may be desired.

It will be understood that the ends of the spring casing or cover 90 may be closed in any desired manner, such as by the application of an adhesive, or by screwing or clamping. Rotation of the threading head may be effected by means other than the motor driven means shown, as, for example, by turning the hand wheel 82. The woven fabric cover may be threaded over this spring 92 before it is severed or cut into proper lengths, and may, after the threading operation, be sealed at both ends. The tubular covering fabric, in whatever order it is cut to lengths and its ends sealed, is gripped by a threading head over a substantial portion of its area and fed or wiped into threaded relation over the spring, by relative movement between the spring and the threading head.

The flexible belt 74, carried forwardly by the rock arm 57 into engagement with the spring 92 and spring cover 90, is adapted to effect the initial threading of the cover over the spring, coacting with the rotating head for this purpose, and after the initial threading, will continue to function as a feeding element for the tubular cover.

As various changes or alterations may be made in accordance with the principles of the invention which are merely exemplified in the typical method and means herein described, it is intended that the invention be considered of scope commensurate with the appended claims.

What is claimed is:

1. Apparatus for applying a tubular cover to a coiled spring, comprising a rotatable threading head having a core of diameter less than the internal diameter of the spring and fins of greater diameter than the spring extending from the core, means for supporting and rotating said head within the spring when the latter is held thereover, the fins of said head being adapted to resiliently engage and wipe over the inner surfaces of the spring, and resilient means adapted to engage a portion of the outer surface of said coiled spring and to have relative movement therewith, said fins and said resilient means being adapted to grip the opposite sides of the tubular cover for feeding it onto one end of said coiled spring.

2. Apparatus for applying a loosely fitting tubular cover to a coiled spring, comprising a threading head mounted for rotation on a shaft, said head being adapted to engage and wipe over the inner surfaces of said coiled spring when the latter is held over said head, and movable means for engaging an outer portion of the spring, when the latter is held over said head, for cooperating with said head to effect initial threading of the tubular cover on said spring and thereafter to feed said cover for sliding movement over said spring.

3. Apparatus for applying a tubular cover to a coiled spring, comprising a head adapted to engage inner surfaces of the spring, means for engaging outer surfaces of the spring, and means for effecting relative tangential movements between said spring and said head and engaging means, whereby the tubular cover member may be gripped and held by said head and engaging means for being threaded over said spring.

4. Apparatus for applying a tubular cover to a coiled spring, comprising a head adapted for rotation in engagement with the interior of said spring, a flexible member adapted for movement in engagement with outer surface portions of said spring, means for simultaneously setting said head and member into motion, and means for moving said flexible member into and out of engagement with said spring.

5. Apparatus for applying a tubular cover to a coiled spring, comprising a plurality of movable means for gripping opposite sides of one end of said cover for effecting initial threading movement of said cover onto said spring, at least one of said plurality of means being adapted to continue in movement and grip said cover for threading the latter substantially over the entire spring.

6. Apparatus for applying a tubular cover having one closed end and one open end to a coiled spring, comprising a rotatable shaft having a head secured to one end thereof, means for rotating said shaft, clutch and brake means associated with said shaft and said means for rotating said shaft, said clutch means being adapted to effect rotation of said shaft and brake means being adapted to stop rotation of said shaft, and said head having resilient portions for engaging the inner surfaces of said coiled spring when the latter is held thereover, whereby the open end of said cover may be gripped by said resilient portions of said head and said cover may be threaded over one end of said spring upon said clutch means being rendered effective, and whereby when the closed end of said cover abuts the said end of said spring the brake means may be rendered effective to stop rotation of said shaft and head.

7. Apparatus for applying a tubular cover to a coiled spring comprising a rotatable shaft removably carrying a threading head at one end thereof, a rock arm having a pulley mounted thereon in alignment with the inner end of said threading head, a second pulley mounted in alignment with said first pulley, an endless belt carried by said pulleys, means for rotating said pulleys and said shaft in opposite directions, and means for moving said rock arm to carry said endless belt toward or away from said threading head.

8. Apparatus for applying a tubular cover to a coiled spring comprising a base, a pair of parallel shafts journalled in said base, the first of said shafts carrying a cover threading head at one outer end thereof, means for effecting or stopping rotation of the first of said shafts and said head, a rock arm mounted on the second of said shafts carrying a pulley in the plane of rotation of said head, a second pulley freely mounted on the second of said shafts and operably associated for rotation by the first of said shafts, an endless belt carried by said pulleys and means for rocking the second of said shafts to effect movement of said endless belt toward and away from said head.

9. Apparatus for applying a tubular cover to a coiled spring comprising a member adapted to receive said spring in substantially co-axial relationship, said member having means therewith for simultaneously engaging a large portion of the entire spring area, whereby upon relative rotation of said spring and member, the latter may grip and hold the tubular cover for threading it upon said spring.

10. Apparatus for applying a tubular cover to a coiled spring comprising a member adapted to receive said spring in a substantially co-axial and telescoping relationship, said member having flexible portions for gripping portions of the said tubular cover, whereby upon relative rotation of said spring and member said cover will be caused to be threaded over said spring.

11. A method of applying a tubular cover to a spring formed of a coiled wire, comprising inserting one end of the spring wire into one end of the cover, gripping the portion of the cover disposed about the spring wire and with continuous movement sliding the cover over the spring wire, and substantially simultaneously gripping and carrying other portions of the cover which pass onto the spring wire over said spring.

12. A method of applying a loosely fitting woven fabric cover to a spring formed of coiled wire, comprising inserting one end of the spring wire into the end of the cover, gripping the portion of the cover so disposed over the wire and with continuous movement sliding the cover over the spring wire, simultaneously gripping for sliding movement over said spring wire other portions of said cover which pass onto the spring wire, and sealing the cover at the ends of said wire to completely encase said spring.

13. A method of applying a loosely fitting flexible cover to a coiled wire spring, comprising inserting one end of the spring wire into the end of the cover, gripping the portions of the cover into which the spring is inserted on the interior of said coiled spring with flexible means, and rotating said flexible means to carry said cover over a substantial part of said spring.

14. A method of applying a loosely fitting cover to a coiled wire spring, comprising passing one end of the cover over an end of the spring wire, gripping with flexible means the surfaces of the cover that are interior of the spring coil and which extend over the spring wire, and effecting relative rotary movement between said flexible means and said spring to carry said cover bodily over said spring wire without producing substantial elongation of the cover.

15. A method of applying a loosely fitting cover to a coiled wire spring, comprising passing one end of the cover over an end of the spring wire, gripping with flexible means the surfaces of the cover that are interior of the spring coil and which extend over the spring wire, effecting relative rotary movement between said flexible means and said spring to carry the cover over said spring wire, and simultaneously gripping portions of said cover adjacent to the said end of the spring wire and carrying said portions over said end of the spring wire.

KENNETH W. MAYHEW.
MELVILLE E. HOLLOWAY.